United States Patent
Glingener et al.

(10) Patent No.: US 6,816,299 B1
(45) Date of Patent: Nov. 9, 2004

(54) METHOD AND SYSTEM FOR OPTIMIZATION OF AN OPTICAL TRANSMISSION SIGNAL WHICH IS MODULATED WITH A BINARY DATA SIGNAL

(75) Inventors: Christoph Glingener, Feldkirchen-Westerham (DE); Erich Gottwald, Holzkirchen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/129,356

(22) PCT Filed: Nov. 3, 2000

(86) PCT No.: PCT/DE00/03869
§ 371 (c)(1),
(2), (4) Date: Aug. 7, 2002

(87) PCT Pub. No.: WO01/33745
PCT Pub. Date: May 10, 2001

(30) Foreign Application Priority Data

Nov. 5, 1999 (DE) .......................................... 199 53 332

(51) Int. Cl.⁷ .............................................. G02F 1/01
(52) U.S. Cl. ..................... 359/276; 359/278; 398/187
(58) Field of Search ................................. 398/182, 183, 398/184, 185, 186, 187; 359/276, 278, 245; 372/38.01

(56) References Cited

U.S. PATENT DOCUMENTS

| 5,629,792 A | 5/1997 | Masaki |
| 5,673,129 A | 9/1997 | Mizrahi |
| 5,706,118 A | 1/1998 | Takano |
| 5,710,653 A | 1/1998 | Nemecek et al. |

FOREIGN PATENT DOCUMENTS

| DE | 20 02 789 | 8/1979 |
| DE | 44 44 218 | 6/1996 |

*Primary Examiner*—Hung Xuan Dang
*Assistant Examiner*—Tuyen Tra
(74) *Attorney, Agent, or Firm*—Bell, Boyd & Lloyd LLC

(57) ABSTRACT

A method and system for optimization of an optical transmissions signal which is modulated with a binary data signal, wherein a control device ensures that the operating point and the modulation signal of a Mach-Zehnder modulator are set optimally, with the fundamental frequency and/or the first harmonic frequency of the transmission signal being selected for this purpose, and an optimum setting is reached when the amplitude of the fundamental frequency has reached a maximum value and the amplitude of the harmonic frequency has reached a minimum value.

40 Claims, 3 Drawing Sheets

METHOD AND SYSTEM FOR OPTIMIZATION OF AN OPTICAL TRANSMISSION SIGNAL WHICH IS MODULATED WITH A BINARY DATA SIGNAL

BACKGROUND OF THE INVENTION

Mach-Zehnder modulators (MZI Mach-Zehnder interferometers) are used in optical transmission systems whose data rates are 10 Gbit/s or more since, at these high data rates and with the present-day state of the art, neither direct modulation of a laser nor modulation using electro-absorption modulators is expedient. Generally, in addition to the modulation signal, MZI modulators require a bias voltage for setting the operating point in order to achieve a balanced output signal and, hence, a balanced eye shape for the received signal. Any deviation of the operating point from this value leads to distortion in the optical transmission signal and, hence, to greater error rates and/or to a reduced range. Like all interferometer arrangements, which react extremely sensitively to a very small optical path length change, the operating point also varies with the environmental conditions, in most available modulators.

An MZI modulator is described, for example, in the "Designer's Guide to External Modulation", UTP, 1289 Blue Hills Avenue, Bloomfield, Conn., pages 4–6. When the modulator is being fully driven, any change in the operating point leads to overdriving, as a result of which, after initially rising, the optical power falls once again, despite the control signal increasing, during the transition from blocking after switching on from "0" to "1". In the event of overdriving, a transmitted "1 bit" peaks in the region of the rising 1 flank, resulting in a relatively high frequency structure in which some of the spectral power is contained in higher frequencies in particular; for example, at twice the fundamental frequency of the data signal, or at the data rate.

Patent specification U.S. Pat. No. 5,710,653 discloses a transmission system having a module for external modulation of a signal, in which harmonic frequencies of the modulated signal are suppressed. A first method uses two Mach-Zender interferometers, arranged in parallel, as modulators, to whose inputs the signal to be modulated is supplied with different amplitudes (80% and 20%), and whose two modulated output signals are combined such that a harmonic frequency from the second output signal is isolated from the fundamental frequency, is inverted and then amplified such that the harmonic frequencies in the resultant modulated signal compensate for one another by addition between the first modulated output signal and the processed isolated harmonic frequency of the second modulated output signal. In the second method, only one modulator is used in order to suppress second-order and third-order harmonic frequencies in the modulated signal. In this case, a distortion network is required to suppress the third-order harmonic frequency in addition to controlling the operating point of the modulator. These two methods suppress third-order harmonic frequencies. An additional control loop is provided for setting the operating point of the modulator or modulators in phase quadrature in order to eliminate the second-order harmonic frequency.

Patent Specification U.S. Pat. No. 5,629,792 discloses a further arrangement and method for modulation of a signal, with closed-loop control of the operating point of the modulator. The closed-loop control controls the operating point of the modulator by measuring the power level of the fundamental frequency of the modulated signal emitted by the modulator. This closed-loop process does not overcome, nor does it minimize, the influences of interference harmonic frequencies in the modulated signal.

An object of the present invention is, therefore, to specify a method which provides as simple a solution approach as possible for suppression of harmonic frequencies. Another aim is to specify a suitable system for doing the same.

Additional features and advantages of the present invention are described in, and will be apparent from, the following Detailed Description of the Invention and the Figures.

SUMMARY OF THE INVENTION

This object is achieved by using the signal at the harmonic frequency which, in each case, has been filtered out to derive a control signal which controls the operating point of the modulator, such that the at least one harmonic frequency reaches a minimum amplitude or power.

The advantage of this solution is that it requires considerably less complexity than the prior art for suppressing harmonic frequencies.

The method makes use of an effect, which occurs when the modulator is overdriven, for regulating the operating point. It is particularly advantageous in this case to combine operating point control with control of the modulation signal. All major parameters are kept constant by the control process.

It is also advantageous for the control criteria to be obtained at the receiving end, and to be transmitted via a service channel. This also makes it possible to partially compensate for distortion caused by the transmission path.

Additional features and advantages of the present invention are described in, and will be apparent from, the following Detailed Description of the Invention and the Figures.

DETAILED DESCRIPTION OF THE INVENTION

Figure 1:
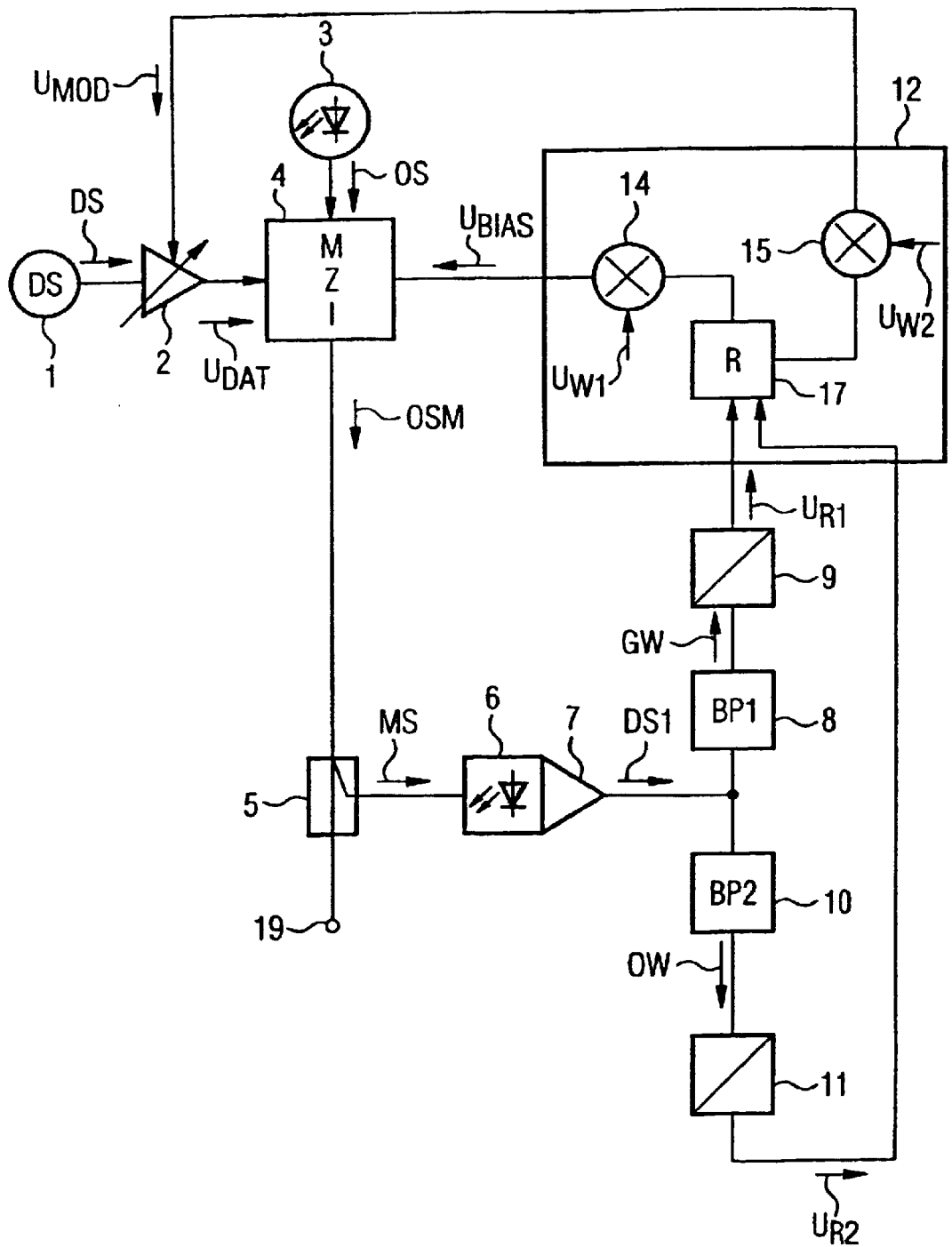
FIG. 1 shows an outline circuit diagram of a system according to the present invention.

The system illustrated in FIG. 1 contains a Mach-Zehnder modulator (MZI) 4, to which an optical signal OS is supplied from a laser 3. The modulator 4 is modulated with a data signal DS, which is supplied from a data source, as a modulation signal $U_{DAT}$, via a controllable amplifier 2. The modulated optical transmission signal OSM is transmitted. A small portion of the signal is supplied via an optical splitter 5 to an optoelectrical transducer 6 with a downstream amplifier 7, and is demodulated. The electrical data signal DS1 recovered in this way essentially contains the modulation signal $U_{DAT}$ or data signal DS. The data signal DS1 is supplied via an amplifier 7 to two filters, the bandpass filters 8 and 10. The first bandpass filter 8 filters the fundamental frequency GW out of the data signal DS1; that is to say, its pass frequency is at half the bit rate. A low-pass-filtered 01 bit sequence essentially results in a sinusoidal voltage at a frequency corresponding to half the data rate (a derived data signal also may be used instead of the NRZ data signal). The output voltage from the first bandpass filter 8 is supplied directly or via a measurement transducer 9, such as a rectifier or a power measurement device, as a control signal $U_{R1}$ to a control device 12. In the exemplary embodiment, a second bandpass filter 10 is provided and tuned to a harmonic frequency OW, preferably the first. Its output voltage is also supplied directly or via a second measurement transducer 11 as a further control signal $U_{R2}$ to the control device 12. Additional bandpass filters also may be provided for filtering out further harmonic frequencies, and their output voltages can be combined. The control device produces, via a regulator 17, a control signal $U_{BIAS}$, which governs the operating point of the modulator 4.

As already mentioned, the first bandpass filter BP1 filters out the fundamental frequency GW. Deviations from the operating point or overdriving caused by an excessively large modulation signal lead to a reduction in the amplitude of the fundamental frequency (sinusoidal signal), since the harmonics which then occur result in the fundamental frequency spectral component decreasing. A corresponding situation applies to the control signal $U_{R1}$ obtained from the sinusoidal signal. An opposite situation applies to the wave form for the harmonic frequencies. Their amplitudes and, thus, the amplitudes of the control signals $U_{R2}$, ... increase when overdriving occurs.

Figure 2:
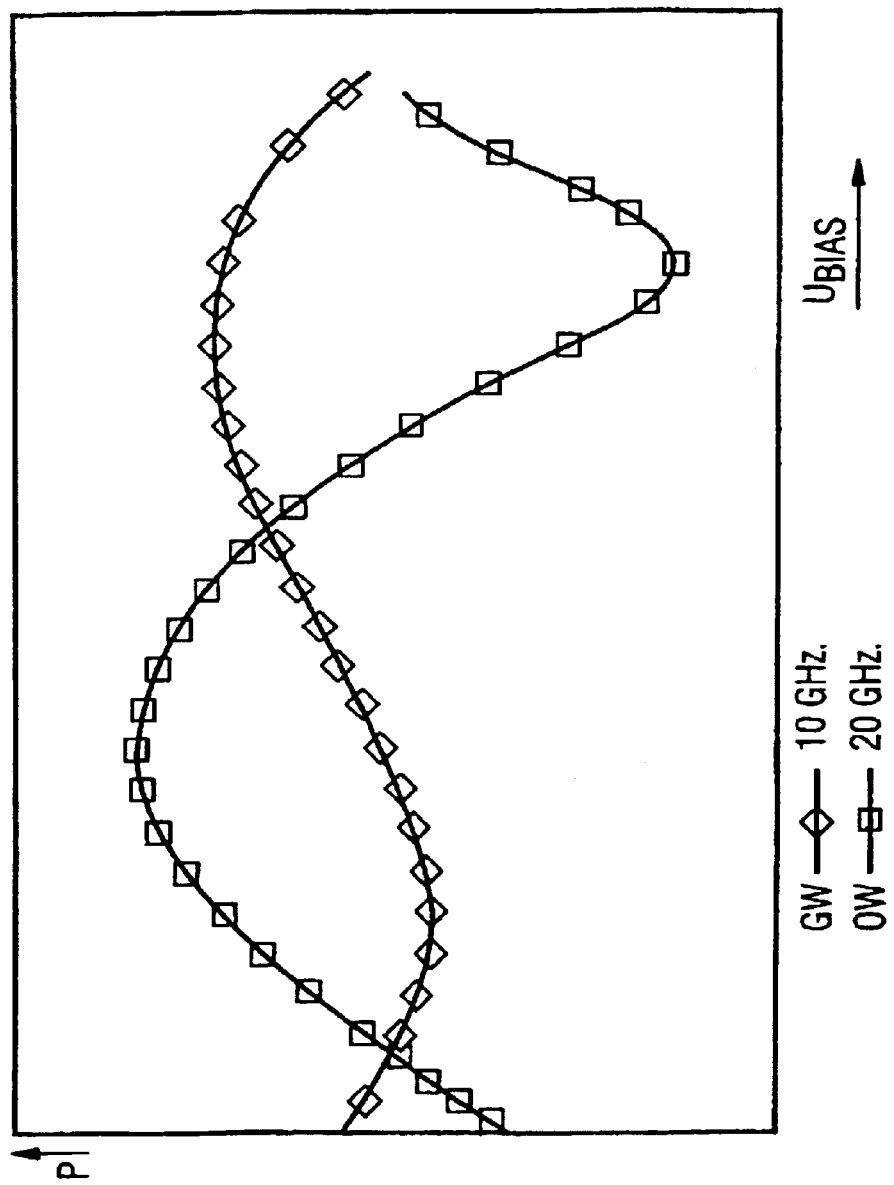
FIG. 2 shows a waveform of the associated control voltage.

The diagram illustrated in FIG. 2 shows the relationship between the power levels P of the fundamental frequency GW and of the first harmonic frequency OW, and the operating point of the modulator. The power (amplitude) of the fundamental frequency has a clear optimum in the region of the ideal operating point. Here, the amplitude of the harmonic frequency (of the harmonic frequencies) is at a minimum which is more strongly dependent on the operating point and which is particularly highly suitable for optimization of the operating point. It is particularly advantageous to combine the two control signals $U_{R1}$ and $U_{R2}$ for operating point control, such as by addition, with one of these signals being inverted, since this leads to the control characteristic having a steeper profile. FIG. 2 shows the main values for the operating point control signal (bias voltage). The optimum occurs at about 4.8 V.

A control device can at the same time be used to convert the data signal DS emitted from the data source to an optimum modulation signal $U_{DAT}$ by using a further control signal $U_{MOD}$ to control the amplifier 2, this optimum modulation signal $U_{DAT}$ being that which leads to a transmission signal with the maximum amplitude and the minimum harmonic content (maximum modulation level). It is sufficient to use the fundamental frequency for control purposes in order to maximize the modulation signal $U_{DAT}$.

During a control process, the control device can be used to produce changes in the control signals $U_{BIAS}$ and $U_{MOD}$ in both directions on a trial basis in order to reach the respective optimum setting. The operating point $U_{BIAS}$ (control signal/bias voltage) and the modulation signal $U_{DAT}$ may, for example, be adjusted alternately. The frequency of the operating point and/or the amplitude of the modulation signal likewise may be swept (periodic variation by a small amount via frequency-sweep voltages $U_{W1}$, $U_{W2}$) in order to determine the mathematical sign of any control error, with the control process being carried out based on the lock-in principle.

It is, of course, also possible to control the amplitude of the laser signal OS and, hence, the amplitude of the transmission signal OSM.

Figure 3:
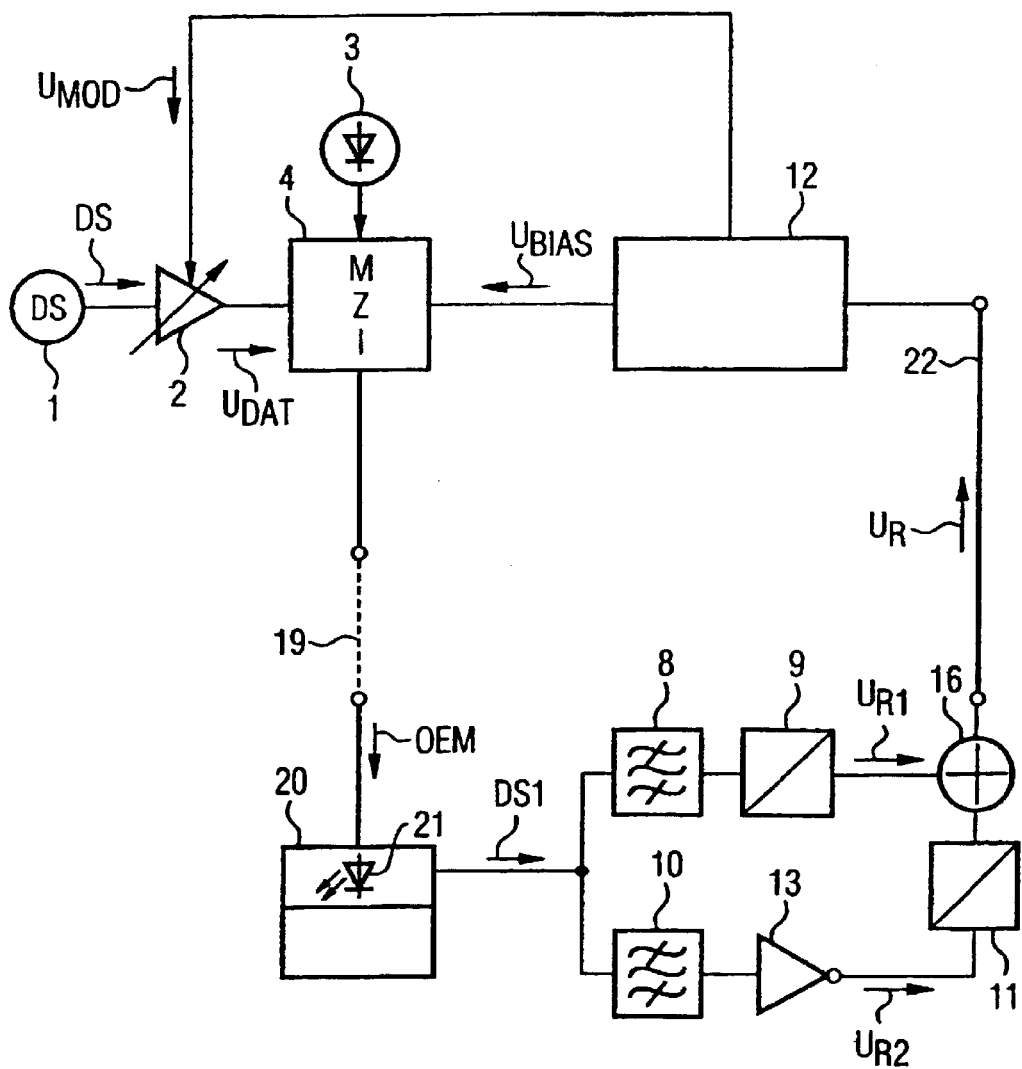
FIG. 3 shows a variant of the system according to the present invention.

FIG. 3 shows a variant in which the control signals $U_{R1}$, $U_{R2}$ are derived from the received signal OEM at the end of a transmission path (at the receiving end). The control process also can, in this way, take account of the line characteristics. The demodulation of the received signal OEM is carried out in a receiving device 20. The demodulated data signal DS1 is once again evaluated via filters 8, 10 and is converted by the measurement transducers 9, 11 to control signals $U_{R1}$, $U_{R2}$ which, after inversion of one control signal via an inverting amplifier 13, are combined in an adder 16 to form a resultant control signal $U_R$.

The control device 12 may be arranged at the receiving end or at the transmitting end. In this exemplary embodiment, the combined control signal $U_R$ is transmitted via a service channel 22 to the control device 12 arranged at the transmitting end, in order to optimize the operating point and/or the amplitude of the modulation signal.

Although the present invention has been described with reference to specific embodiments, those of skill in the art will recognize that changes may be made thereto without departing from the spirit and scope of the present invention as set forth in the hereafter appended claims.

What is claimed is:

1. A method for amplitude modulation of an optical signal with a binary data signal, the method comprising the steps of:

supplying both the optical signal and the binary data signal to a modulator, whose operating point is adjustable, for producing an optical transmission signal;

demodulating the transmission signal or a measurement signal, which is tapped off the transmission signal;

converting the demodulated signal to a recovered binary data signal;

selecting by filtering out from the recovered data signal both a fundamental frequency and at least one harmonic frequency;

deriving from the recovered binary data signal a fundamental frequency control signal and the at least one harmonic frequency control signal; and controlling the operating point of the modulator for optimum adjustment such that the fundamental frequency reaches for a maximum amplitude or power and the at least one of the harmonic frequencies reaches for a minimum amplitude or power.

2. A method for amplitude modulation of an optical signal with a binary data signal as claimed in claim 1, the method further comprising the steps of:

converting the binary data signal to a modulation signal which is supplied to the modulator; and regulating an amplitude of the modulation signal at a value at which one of the fundamental frequency and a control signal formed from the fundamental frequency and the inverted harmonic frequency reaches a maximum.

3. A method for amplitude modulation of an optical signal with a binary data signal as claimed in claim 2, the method further comprising the step of varying one of the operating point and an amplitude of the modulation signal on a trial basis until the fundamental frequency has reached a maximum value.

4. A method for amplitude modulation of an optical signal with a binary data signal as claimed in claim 3, wherein the operating point and the modulation signal are optimally set alternately.

5. A method for amplitude modulation of an optical signal with a binary data signal as claimed in claim 2, the method further comprising the step of varying one of the operating point and an amplitude of the modulation signal on a trial basis until the fundamental frequency has reached a maximum value and the harmonic frequency has reached a minimum value at the same time.

6. A method for amplitude modulation of an optical signal with a binary data signal as claimed in claim 5, wherein the operating point and the modulation signal are optimally set alternately.

7. A method for amplitude modulation of an optical signal with a binary data signal as claimed in claim 2, wherein the operating point control signal and the amplitude of the modulation signal are optimized by sweeping respective frequencies of the operating point control signal and the modulation signal, and by control being carried out in each case based on a lock-in principle.

8. A method for amplitude modulation of an optical signal with a binary data signal as claimed in claim 1, the method further comprising the steps of:

producing the recovered data signal by demodulation of an optical received signal;

deriving control signals from the recovered data signal;

supplying the control signals to a control device arranged at a transmission end; and transmitting control signals via the control device and via a service channel to the modulator.

9. A method for amplitude modulation of an optical signal with a binary data signal as claimed in claim 1, the method further comprising the steps of:

producing the recovered data signal by demodulation of an optical received signal;

deriving controlled signals from the recovered data signal;

supplying the control signals to a control device arranged at a transmission end; and transmitting control signals to a control device arranged at a receiving end, the control device controlling the modulator via a service channel.

10. A system for amplitude modulation of an optical signal with a binary data signal, comprising:

a modulator with an adjustable operating point, the modulator having an output at which a modulated transmission signal is emitted based on the optical signal and the binary data signal;

a demodulator, in a control loop, through which one of the transmission signal or a measurement signal which corresponds to the transmission signal is supplied in order to obtain a recovered binary data signal from it;

a first filter, in the control loop, which selects a fundamental frequency of the recovered binary data signal;

at least one second filter, in the control loop, which selects at least one harmonic frequency of the recovered binary data signal;

at least one measurement transducer, in the control loop, for obtaining control signals from at least the first and second filters; and a control device, in the control loop, for controlling the operating point of the modulator such that the amplitude of the fundamental frequency reaches for a maximum value; and the amplitude of the at least one harmonic frequency reaches for a minimum value.

11. A system for amplitude modulation of an optical signal with a binary data signal as claimed in claim 10, further comprising an adjustable amplifier for converting the binary data to a modulation signal, wherein the modulation signal is regulated at a maximum value at which the amplitude of the fundamental frequency is at a maximum.

12. A system for amplitude modulation of an optical signal with a binary data signal as claimed in claim 10, further comprising an adjustable amplifier for converting the data signal to a modulation signal, wherein the modulation signal is regulated at a maximum value at which the amplitude of the fundamental frequency is at a maximum and the amplitude of the at least one harmonic frequency is at a minimum.

13. A method for amplitude modulation of an optical signal with a binary data signal, the method comprising the steps of:

supplying both the optical signal and the binary data signal to a modulator for producing a transmission signal whose operating point is adjustable;

demodulating one of the transmission signal and a measurement signal, which is tapped off the transmission signal;

converting the demodulated signal to a recovered data signal;

filtering out at least one harmonic frequency of the recovered data signal;

converting the data signal to a modulation signal which is supplied to the modulator;

regulating an amplitude of the modulation signal at a value at which one of the fundamental frequency and a control signal formed from the fundamental frequency and the inverted harmonic frequency reaches a maximum;

using a signal at the at least one harmonic frequency, which has been filtered out, to derive a control signal which controls an operating point of the modulator such that the at least one harmonic frequency reaches one of a minimum amplitude and a minimum power; and varying one of the operating point and an amplitude of the modulation signal on a trial basis until the fundamental frequency has reached a maximum value.

14. A method for amplitude modulation of an optical signal with a binary data signal as claimed in claim 13, the method further comprising the steps of:

selecting both a fundamental frequency and the at least one harmonic frequency from the recovered data signal; and using control signals derived from the fundamental frequency and the at least one harmonic frequency for optimum adjustment of the operating point.

15. A method for amplitude modulation of an optical signal with a binary data signal as claimed in claim 13, the method further comprising the step of varying one of the operating point and an amplitude of the modulation signal on a trial basis until the fundamental frequency has reached a maximum value and the harmonic frequency has reached a minimum value at the same time.

16. A method for amplitude modulation of an optical signal with a binary data signal as claimed in claim 15, wherein the operating point and the modulation signal are optimally set alternately.

17. A method for amplitude modulation of an optical signal with a binary data signal as claimed in claim 13, wherein the operating point and the modulation signal are optimally set alternately.

18. A method for amplitude modulation of an optical signal with a binary data signal as claimed in claim 13, wherein the operating point control signal and the amplitude of the modulation signal are optimized by sweeping respective frequencies of the operating point control signal and the modulation signal, and by control being carried out in each case based on a lock-in principle.

19. A method for amplitude modulation of an optical signal with a binary data signal as claimed in claim 13, the method further comprising the steps of:
producing the recovered data signal by demodulation of an optical received signal;
deriving control signals from the recovered data signal;
supplying the control signals to a control device arranged at a transmission end; and
transmitting control signals via the control device and via a service channel to the modulator.

20. A method for amplitude modulation of an optical signal with a binary data signal as claimed in claim 13, the method further comprising the steps of:
producing the recovered data signal by demodulation of an optical received signal;
deriving controlled signals from the recovered data signal;
supplying the control signals to a control device arranged at a transmission end; and
transmitting control signals to a control device arranged at a receiving end, the control device controlling the modulator via a service channel.

21. A method for amplitude modulation of an optical signal with a binary data signal, the method comprising the steps of:
supplying both the optical signal and the binary data signal to a modulator for producing a transmission signal whose operating point is adjustable;
demodulating the transmission signal;
converting the demodulated signal to a recovered data signal;
deriving control signals from the recovered data signal;
supplying the control signals to a control device arranged at a transmission end;
transmitting control signals via the control device and via a service channel to the modulator;
filtering out at least one harmonic frequency of the recovered data signal; and
using a signal at the at least one harmonic frequency, which has been filtered out, to derive a control signal which controls an operating point of the modulator such that the at least one harmonic frequency reaches one of a minimum amplitude and a minimum power.

22. A method for amplitude modulation of an optical signal with a binary data signal as claimed in claim 21, the method further comprising the steps of:
selecting both a fundamental frequency and the at least one harmonic frequency from the recovered data signal; and
using control signals derived from the fundamental frequency and the at least one harmonic frequency for optimum adjustment of the operating point.

23. A method for amplitude modulation of an optical signal with a binary data signal as claimed in claim 21, the method further comprising the steps of:
converting the binary data signal to a modulation signal which is supplied to the modulator; and
regulating an amplitude of the modulation signal at a value at which one of the fundamental frequency and a control signal formed from the fundamental frequency and the inverted harmonic frequency reaches a maximum.

24. A method for amplitude modulation of an optical signal with a binary data signal as claimed in claim 23, the method further comprising the step of varying one of the operating point and an amplitude of the modulation signal on a trial basis until the fundamental frequency has reached a maximum value.

25. A method for amplitude modulation of an optical signal with a binary data signal as claimed in claim 24, wherein the operating point and the modulation signal are optimally set alternately.

26. A method for amplitude modulation of an optical signal with a binary data signal as claimed in claim 23, the method further comprising the step of varying one of the operating point and an amplitude of the modulation signal on a trial basis until the fundamental frequency has reached a maximum value and the harmonic frequency has reached a minimum value at the same time.

27. A method for amplitude modulation of an optical signal with a binary data signal as claimed in claim 26, wherein the operating point and the modulation signal are optimally set alternately.

28. A method for amplitude modulation of an optical signal with a binary data signal as claimed in claim 23, wherein the operating point control signal and the amplitude of the modulation signal are optimized by sweeping respective frequencies of the operating point control signal and the modulation signal, and by control being carried out in each case based on a lock-in principle.

29. A method for amplitude modulation of an optical signal with a binary data signal as claimed in claim 21, the method further comprising the steps of:
producing the recovered data signal by demodulation of an optical received signal;
deriving controlled signals from the recovered data signal;
supplying the control signals to a control device arranged at a transmission end; and
transmitting control signals to a control device arranged at a receiving end, the control device controlling the modulator via a service channel.

30. A method for amplitude modulation of an optical signal with a binary data signal, the method comprising the steps of:
supplying both the optical signal and the binary data signal to a modulator for producing a transmission signal whose operating point is adjustable;
demodulating the transmission signal;
converting the demodulated signal to a recovered data signal;
deriving controlled signals from the recovered data signal;
supplying the control signals to a control device arranged at a transmission end;
transmitting control signals to a control device arranged at a receiving end, the control device controlling the modulator via a service channel;
filtering out at least one harmonic frequency of the recovered data signal; and
using a signal at the at least one harmonic frequency, which has been filtered out, to derive a control signal which controls an operating point of the modulator such that the at least one harmonic frequency reaches one of a minimum amplitude and a minimum power.

31. A method for amplitude modulation of an optical signal with a binary data signal as claimed in claim 30, the method further comprising the steps of:

selecting both a fundamental frequency and the at least one harmonic frequency from the recovered data signal; and using control signals derived from the fundamental frequency and the at least one harmonic frequency for optimum adjustment of the operating point.

32. A method for amplitude modulation of an optical signal with a binary data signal as claimed in claim 30, the method further comprising the steps of:

converting the binary data signal to a modulation signal which is supplied to the modulator; and regulating an amplitude of the modulation signal at a value at which one of the fundamental frequency and a control signal formed from the fundamental frequency and the inverted harmonic frequency reaches a maximum.

33. A method for amplitude modulation of an optical signal with a binary data signal as claimed in claim 32, the method further comprising the step of varying one of the operating point and an amplitude of the modulation signal on a trial basis until the fundamental frequency has reached a maximum value.

34. A method for amplitude modulation of an optical signal with a binary data signal as claimed in claim 33, wherein the operating point and the modulation signal are optimally set alternately.

35. A method for amplitude modulation of an optical signal with a binary data signal as claimed in claim 32, the method further comprising the step of varying one of the operating point and an amplitude of the modulation signal on a trial basis until the fundamental frequency has reached a maximum value and the harmonic frequency has reached a minimum value at the same time.

36. A method for amplitude modulation of an optical signal with a binary data signal as claimed in claim 35, wherein the operating point and the modulation signal are optimally set alternately.

37. A method for amplitude modulation of an optical signal with a binary data signal as claimed in claim 32, wherein the operating point control signal and the amplitude of the modulation signal are optimized by sweeping respective frequencies of the operating point control signal and the modulation signal, and by control being carried out in each case based on a lock-in principle.

38. A method for amplitude modulation of an optical signal with a binary data signal as claimed in claim 30, the method further comprising the steps of:

producing the recovered data signal by demodulation of an optical received signal;

deriving control signals from the recovered data signal;

supplying the control signals to a control device arranged at a transmission end; and transmitting control signals via the control device and via a service channel to the modulator.

39. A system for amplitude modulation of an optical signal with a binary data signal, comprising:

a modulator with an adjustable operating point, the modulator having an output at which a modulated transmission signal is emitted;

a demodulator, in a control loop, through which one of the transmission signal or a measurement signal which corresponds to the transmission signal is supplied in order to obtain a recovered binary data signal from it;

a first filter, in the control loop, which selects a fundamental frequency of the recovered binary data signal;

at least one second filter, in the control loop, which selects at least one harmonic frequency of the recovered binary data signal;

at least one measurement transducer, in the control loop, for obtaining control signals from at least the first and second filters, wherein the measurement transducers are power measurement devices; and a control device, in the control loop for controlling the operating point of the modulator such that the amplitude of the fundamental frequency reaches for a maximum value; and the amplitude of the at least one harmonic frequency reaches for a minimum value.

40. A system for amplitude modulation of an optical signal with a binary data signal as claimed in claim 39, further comprising an adjustable amplifier for converting the binary data signal to a modulation signal, wherein the modulation signal is regulated at a maximum value at which the amplitude of the fundamental frequency is at a maximum.

* * * * *